(12) United States Patent
Bates et al.

(10) Patent No.: US 9,117,017 B2
(45) Date of Patent: *Aug. 25, 2015

(54) DEBUGGER WITH PREVIOUS VERSION FEATURE

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/800,965

(22) Filed: Mar. 13, 2013

(65) Prior Publication Data

US 2014/0229915 A1 Aug. 14, 2014

Related U.S. Application Data

(63) Continuation of application No. 13/763,995, filed on Feb. 11, 2013.

(51) Int. Cl.
*G06F 9/44* (2006.01)
*G06F 11/36* (2006.01)

(52) U.S. Cl.
CPC .......... *G06F 11/362* (2013.01); *G06F 11/3624* (2013.01)

(58) Field of Classification Search
None
See application file for complete search history.

(56) References Cited

U.S. PATENT DOCUMENTS

| 4,558,413 | A | 12/1985 | Schmidt et al. |
| 5,774,728 | A * | 6/1998 | Breslau et al. ................ 717/141 |
| 6,757,893 | B1 | 6/2004 | Haikin |
| 7,318,223 | B2 * | 1/2008 | Blainey et al. ................ 717/160 |
| 8,312,447 | B2 | 11/2012 | Callaghan et al. |
| 2002/0147969 | A1 * | 10/2002 | Lethin et al. .................. 717/138 |
| 2006/0147969 | A1 * | 7/2006 | Kuimelis et al. ................ 435/6 |
| 2006/0242207 | A1 | 10/2006 | Tsyganskiy et al. |
| 2008/0127134 | A1 * | 5/2008 | Tirumalai et al. ............. 717/140 |
| 2009/0100410 | A1 * | 4/2009 | Pouliot ......................... 717/122 |
| 2009/0158019 | A1 * | 6/2009 | O'Brien et al. ............... 712/245 |
| 2009/0232304 | A1 * | 9/2009 | King ............................. 380/210 |
| 2011/0271259 | A1 | 11/2011 | Moench et al. |
| 2011/0296381 | A1 * | 12/2011 | Mooney ......................... 717/122 |
| 2012/0204065 | A1 * | 8/2012 | Tsafrir et al. ................ 714/38.1 |
| 2012/0233600 | A1 | 9/2012 | Uno |

* cited by examiner

*Primary Examiner* — Isaac T Tecklu
(74) *Attorney, Agent, or Firm* — James R. Nock

(57) ABSTRACT

According to embodiments of the invention, methods, computer readable storage medium, and a computer system for providing multiple versions of elements of a program in a single compile are disclosed. The method may include receiving a request to compile a current version of a program for debug. The method may also include identifying, by an integrated development environment, a previous version of an element of the program, wherein the previous version of the element is identified by comparing the current version of the program to a previous version of the program. The method may also include inserting the previous version of the element into the current version of the program. The method may also include creating a compiler directive identifying the previous version of the element. The method may also include compiling the current version of the program for debug.

10 Claims, 5 Drawing Sheets

| VERSION DATA | | | |
|---|---|---|---|
| NAME | PREVIOUS VERSION | CURRENT OFFSET | PREVIOUS VERSION OFFSET |
| ROUTINE A | 1.2.33 | 0x4F6 | 0x6DA |
| ROUTINE B | 1.2.33 | 0x192 | 0x20A |

FIG. 3

134 — OBJECT CODE FOR PROGRAM A

MACHINE INSTRUCTIONS FOR ROUTINE A (402)

| OFFSET (408) | MACHINE INSTRUCTIONS (410) |
|---|---|
| 200F | LOAD R1, A |
| 2800 | INC R1 |
| 2870 | STORE R1, A; STORE R2, B; STORE R3, C; JMP 4500 |
| 2950 | CMP R1, R2; JMPC 3060 |
| 2980 | LOAD R2, R3 |
| 3020 | ... |
| 3060 | STORE R1, A; STORE R2, B; STORE R3, C; LOAD R1, R3 |

MACHINE INSTRUCTIONS FOR ROUTINE B (404)

MACHINE INSTRUCTIONS FOR ROUTINE C (406)

FIG. 4

DEBUGGER WITH PREVIOUS VERSION FEATURE

CROSS-REFERENCE TO RELATED APPLICATIONS

This application is a continuation of co-pending U.S. patent application Ser. No. 13/763,995, filed Feb. 11, 2013. The aforementioned related patent application is herein incorporated by reference in its entirety.

TECHNICAL FIELD

The present invention relates to the field of computer systems, and more specifically, to computer systems that execute instructions and a system for debugging such instructions.

BACKGROUND

Computer systems typically include a combination of computer programs and hardware, such as semiconductors, transistors, chips, circuit boards, storage devices, and processors. The computer programs are stored in the storage devices and are executed by the processors. Locating, analyzing, and correcting suspected faults in a computer program is a process known as "debugging." Bugs are problems, faults, or errors in a computer program. Typically, a programmer uses another computer program commonly known as a debugger to debug the program under development.

SUMMARY

According to embodiments of the invention, methods, computer readable storage medium, and a computer system for providing multiple versions of elements of a program in a single compile are disclosed. The method may include receiving a request to compile a current version of a program for debug. The method may also include identifying, by an integrated development environment, a previous version of an element of the program, wherein the previous version of the element is identified by comparing the current version of the program to a previous version of the program, and the previous version of the element and a current version of the element are different. The method may also include inserting the previous version of the element into the current version of the program. The method may also include creating a compiler directive identifying the previous version of the element, wherein the compiler directive instructs a compiler to designate the previous version of the element unreachable during the execution of the current version of the program during debug unless the current version of the program is modified so that the previous version of the element is called and executed in place of the current version of the element. The method may also include compiling the current version of the program for debug.

BRIEF DESCRIPTION OF THE SEVERAL VIEWS OF THE DRAWINGS

FIG. 3 depicts a block diagram of an example data structure for version data, according to an embodiment of the invention.

FIG. 4 depicts a block diagram of example object code, according to an embodiment of the invention.

In the drawings and the Detailed Description, like numbers generally refer to like components, parts, steps, and processes.

DETAILED DESCRIPTION

When a computer program is created by a programmer it is commonly created as source code. However, in order for a processor of a computer to run the program it must be translated, or compiled, by a compiler from source code into object code, or machine code. The object code is also typically used in the process of debugging the program. A common debugging process begins with compiling the program. The object code may then be executed in a debugger in order to discover errors in the program. The programmer then modifies the source code to try and fix any errors. The modified source code must then be compiled in order to continue debugging. As a computer program is developed, these steps may be repeated many times. This may result in multiple versions of various elements of the program, such as routines, blocks, or lines. After a programmer executes a current version of the program in the debugger and receives one or more errors, it may be useful to the programmer to be able to execute a previous version of an element of the program. However, this becomes onerous if the programmer is required to recompile the previous versions in order to access them. For example, a programmer may run a program consisting of ten routines through a debugger and receives four errors. It may be advantageous to the programmer to have the ability to selectively execute previous versions of each of the ten routines in order to determine if a modification to a particular routine created any of the four errors. The programmer is at an advantage if this process can be done without having to recompile the program.

Embodiments of the present invention provide multiple versions of elements of a program in a single compile so that a programmer may execute the multiple versions without having to recompile. When a programmer requests a compile of a source code of a program in order to debug the program, an integrated development environment (IDE) may check a code repository for previous versions of various elements of the program. If previous versions of any are present, the IDE may place those previous versions in the source code prior to compile. The IDE may also provide the capability of selectively executing the previous versions during debug. After compile is completed, the programmer may begin debugging the program. If the programmer encounters an error during debug, the debugger may execute a previous version in place of the current version. This allows the programmer access to multiple versions of elements of a program without requiring multiple compiles of the program.

Figure 1:
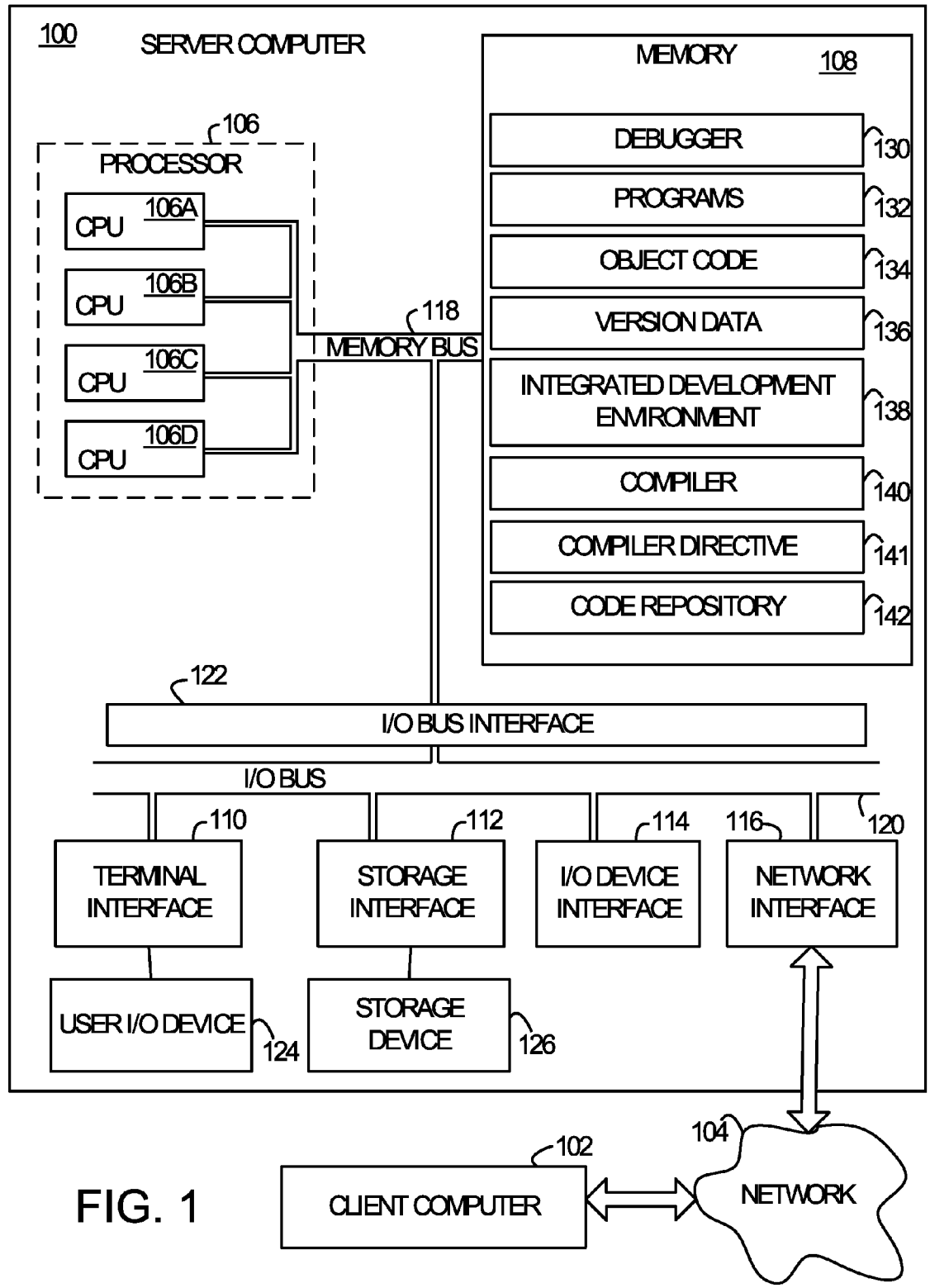
FIG. 1 depicts a high-level block diagram of an exemplary system for implementing an embodiment of the invention.

Referring to the drawings, wherein like numbers denote like parts throughout the several views, FIG. 1 depicts a high-level block diagram representation of a server computer system 100 connected to a client computer system 102 via a network 104, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode a debugger 130, programs 132, object code 134, version data 136, an integrated development environment (IDE) 138, a compiler 140, a compiler directive 141, and a code repository 142, hereafter collectively referred to as "memory elements." Although the memory elements are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the memory elements are illustrated as being contained within the main memory 108, these elements are not necessarily completely contained in the same storage device at the same time. Further, although the memory elements are illustrated as being separate entities, in other embodiments some of them, portions of some of them, or all of them may be packaged together.

In an embodiment, the memory elements may include instructions or statements that execute on the processor 106 or instructions or statements that may be interpreted by instructions or statements that execute on the processor 106, to carry out the functions as further described below with reference to FIGS. 2, 3, 4, 5, and 6. In another embodiment, memory elements, or two or more of these elements may be implemented in hardware via semiconductor devices, chips, logical gates, circuits, circuit cards, other physical hardware devices, or a combination of these devices in lieu of, or in addition to, a processor-based system. In an embodiment, the memory elements, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices using a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100 to other digital devices and computer systems 102; such paths may include, e.g., one or more networks 104.

Figure 2:
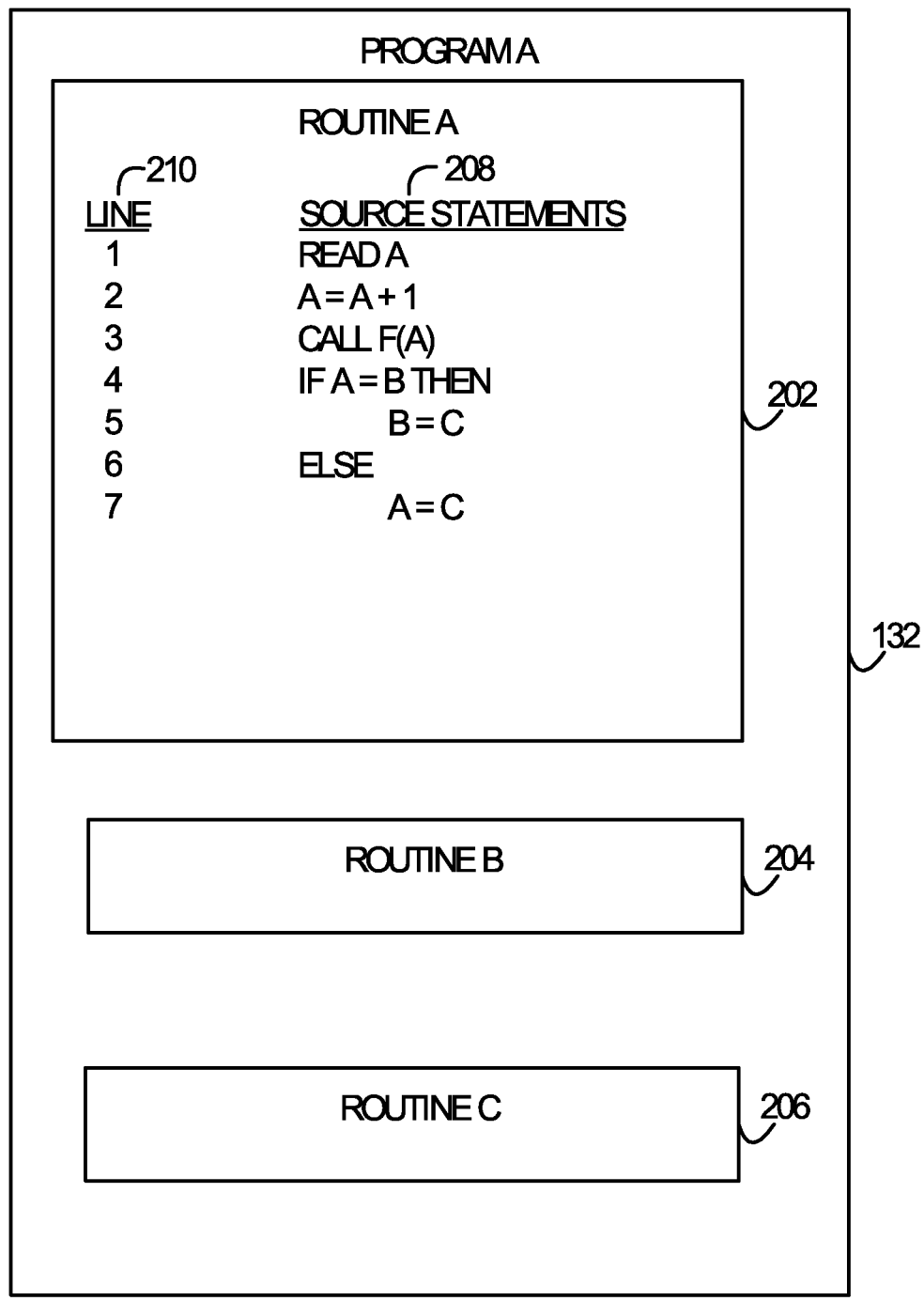
FIG. 2 depicts a block diagram of an example software program, according to an embodiment of the invention.

FIG. 2 depicts a block diagram of an example software program A 132, according to an embodiment of the invention. The program A 132 includes any number of routines, such as a routine A 202, a routine B 204, and a routine C 206. The example routine A 202 includes example source statements 208 and corresponding lines 210 at which the source statements 208 may be stored in the routine 202. Each of the source statements 208 may be identified by its respective line number 210, which may be numbered sequentially from beginning to end of the routine 202 or the program 132. The source statements 208 may be human-readable source code. The use of the term "routine" in regards to elements of the program 132 is for illustrative purposes. In other embodiments, an element of the program 132 may include any identifiable entity within the program 132, such as a block, line, or any similar entity.

The compiler 144 compiles the programs 132, which include source code or statements, into the object code 134, which includes machine instructions that execute on the processor 106. In an embodiment, the compiler 144 may translate the programs 132 into an intermediate form before translating the intermediate form into the object code 134. In an embodiment, the compiler 144 may be a just-in-time compiler that executes as part of an interpreter. In an embodiment, the compiler 144 may be an optimizing compiler. In various embodiments, the compiler 144 may perform peephole optimizations, local optimizations, loop optimizations, inter-procedural or whole-program optimizations, machine code optimizations, or any other optimizations to reduce the amount of time required to execute the object code 134, to reduce the amount of memory required to execute the object code 134, or both. In an embodiment, the optimizations performed by the compiler 144 may result in the values of variables used by the object code 134 being kept in registers and not necessarily immediately stored to memory.

FIG. 3 depicts a block diagram of an example data structure for version data 136, according to an embodiment of the invention. The version data 136 includes example records 202, and 204, each of which includes a name field 306, a previous version field 308, a current version offset field 310, and a previous version offset field 312. Example records 202 and 204 may be elements, such as routines, within a program 132 or any other part of the program 132, such as a line 210 within a routine 202. The name field 306 may identify an element within the program 132. The previous version field 308 may identify a previous version of the element that the IDE 138 has identified from the code repository 142. The IDE 138 may identify previous versions of elements by comparing the elements of a current version of the program 132 to the corresponding elements of previous versions of the program 132 which are present in the code repository 142. If an element has changed from a previous version to the current version then the element from the previous version of the program is a previous version of the element and may be identified as such in the previous version field 308. The current version offset field 310 may identify the location of the start of the current version of the element within the object code 134. The previous version offset field 312 may identify the location of the start of the previous version of the element from the previous version field 308. The fields 306, 308, 310, and 312 may be populated and updated by the IDE 138 or any similar program.

FIG. 4 depicts a block diagram of example object code 134, according to an embodiment of the invention. The object code 134 includes example machine instructions 402 for the routine A 202 of the program A 132, machine instructions 404 for the routine B 204 of the program A 132, and machine instructions 406 for the routine C 206 of the program A 132. The machine instructions 402, when executed on the processor 106, implement the routine A 202 of the program A 132. The machine instructions 404, when executed on the processor 106, implement the routine B 204 of the program A 132. The machine instructions 406, when executed on the processor 106, implement the routine C 206 of the program A 132. For convenience of exposition and ease of understanding, the machine instruction field 410 in FIG. 4 illustrates example assembly language instructions, but the actual machine instructions executed by the processor 106 may be binary codes, in an embodiment. In other embodiments, the processor 106 may execute any appropriate type of machine instructions.

The machine instructions 402 may include any number of entries, each including an offset field 408 and a machine instructions field 410. The offset field 408, in each entry, includes the offset, distance, or amount of storage between the start of the machine instructions 402 (or alternatively the start of the object code 134) and the entry. The debugger 130 maps the lines in the program 132 to the machine instructions in the object code 134. Thus, for example, "load r1, A" at offset 200F represents the machine instruction that implements line 1 of the program 132 and, when executed, reads the value from the memory location of variable A into register R1. "Store R1, A; Store R2, B; Store R3, C" at offsets 2870 and 3060 represent the machine instructions of the snapshot instructions, which store the values from the registers R1, R2, and R3 to the memory locations that store the respective variables A, B, and C, which may be all of the variables referenced by the example program 132. The snapshot instructions may be immediately before their associated machine instructions, e.g., the "Store R1, A; Store R2, B; Store R3, C" at offset 2870 may be immediately before "JMP 4500" (which implements the source statement "CALL F(A)" at line 3 of the program 132) and immediately after "INC R1" (which implements the source statement "A=A+1" at line 2 of the program 132).

Figure 5:
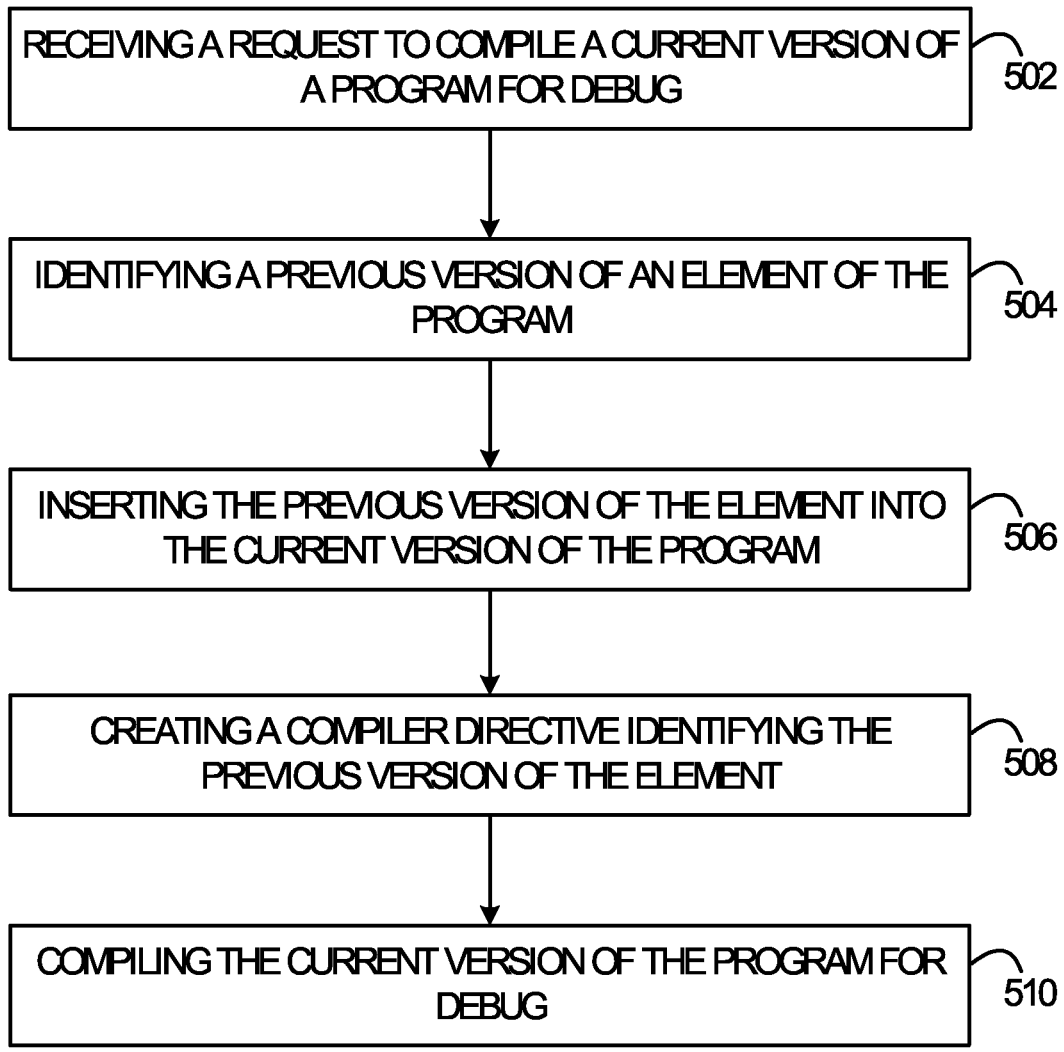
FIG. 5 depicts a block diagram of example process for providing multiple versions of elements of a program in a single compile, according to an embodiment of the invention.

FIG. 5 depicts a block diagram of an example process for providing multiple versions of elements of a program 132 in a single compile. Block 502 may include receiving a request to compile a current version of a program 132 for debug. The request may come from a user or programmer, and may be received by the IDE 138. Compiling the program 132 for debug may include converting the program 132 from human-readable source code into machine readable object code 134 so that the program may be executed within a debugger 130. The program 132 may consist of multiple discreet elements or sections, such as routines, blocks or lines. Examples of routines are depicted in FIG. 2 as routine A 202, routine B 204, and routine C 206.

Block 504 may include identifying a previous version of an element of the program 132. As previously stated, the element may be any identifiable entity within the program 132, such as a routine, block, line, or any similar entity. A previous version of an element may be defined as a version of the element from a previous version of the program 132 that is different from the version of the element from a current version of the program 132. As the program 132 is developed it may be changed multiple times. The multiple changes may produce multiple versions of the program 132. These versions may be stored in the code repository 142. The IDE 138 may compare the elements of the current version of the program 132 to the corresponding elements of the previous versions of the program within the code repository 142. If an element from a previous version of the program 132 is different than the corresponding element from the current version of the program 132, then the element from the previous version of the program 132 may be designated as a previous version of the element and may be identified in the previous version field 308 of the version data 136. Any number of previous versions from any number of elements may be identified, and different elements of the program 132 may have differing numbers of previous versions. For example, if one element remains largely unchanged between the versions of the program 132, that element may have few previous versions. In contrast, if an element goes through many changes between versions, that element may have many previous versions.

Block 506 may include inserting the previous versions of the elements into the current version of the program 132. After one or more previous versions of the elements of the program 132 have been identified they may be inserted into the source code of the current version of the program 132 by the IDE 138. The previous versions of the elements are inserted in order to be compiled so they may be called and executed during debug. They may be inserted anywhere in the current version of the program 132 that may allow them to be compiled for the purpose of debugging. For example, the previous versions of the elements may be placed immediately after the current version of the elements. Inserting the previous versions of the elements may also include inserting a latest previous version of the elements. A latest previous version may be the previous version of the element that was created most recently to the current version of the element. In other embodiments, inserting the previous versions of the elements may include inserting all previous versions of the elements created within a predetermined time frame. For example, all of the previous versions of the elements created within the last year.

Block 508 may include creating a compiler directive 141. The compiler directive 141 may be created in order for the compiler 140 to identify the previous versions of the elements and their location within the current version of the program. The compiler directive 141 may also instruct the compiler 140 to designate the previous versions of the elements unreachable during the execution of the current version of the program during debug. This designation will prevent the previous versions of the elements from being called and executed unless the current version of the program 132 is modified.

Creating the compiler directive 141 may include mangling the names of the previous versions of the elements. This may be accomplished by making a minor change to the name of the version. Mangling the names may serve to differentiate the previous versions and the current version so they do not interfere with one another. Creating the compiler directive 141 may also include producing a mapping to the previous versions. The mapping may identify the location of the previous versions of the elements within the current version of the program. An example of the mapping is the previous version offset field 312 of the version data 136.

Creating the compiler directive 141 may also include flagging the previous version. This may serve to identify the previous versions of the elements to the compiler 140. Once the compiler 140 is able to identify previous versions, the compiler 140 may be configured to disregard only the previous versions of the elements if they are not compatible to the compiling of the current version of the program. For example, if the previous version of the element that has been identified contains a global variable that is no longer present in the current version of the program, the compiler 140 may reject the previous version of the element without interrupting the compiling process.

Block 508 may include compiling the current version of the program for debug. The source code of the current version of the program containing the current version of the elements and the inserted previous versions of the elements may be compiled in order to complete the request from block 502. Along with compiling the source code, the compiler 140 may also generate the version data 136 and include it in the debug information.

The compiled source code of the current version of the program may be made available to a debugger 130 in order to debug the current version of the program. A debug of the current version of the program may include the debugger 130 calling and executing the current version of the elements. If one or more errors are received from this execution a programmer may instruct the debugger 130 to execute the current version of the program and call and execute the previous versions of the elements in place of the current version of the elements. The previous versions of the elements may be used in place of the current version until the programmer reverts back to the current version. In other embodiments, the previous versions of the elements may be used in place of the current version for a predetermined number of executions. Upon the completion of the predetermined executions the debugger 130 will revert back to the current version.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 102 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable storage medium. For example, a computer-readable storage medium may be, but not limited to, an electronic, magnetic, optical, electromagnetic, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/ or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A computer readable storage medium having program instructions stored thereon, wherein the computer readable storage medium is not a transitory signal per se, the program instructions executable by one or more computer processor circuits to cause a processor to perform the following operations:

receiving a request to compile a current version of a program for debug;

identifying, by an integrated development environment, a previous version of an element of the program, wherein the previous version of the element is identified by comparing the current version of the program to a previous version of the program, and the previous version of the element and a current version of the element are different;

inserting the previous version of the element into the current version of the program;

creating a compiler directive identifying the previous version of the element, wherein the compiler directive instructs a compiler to designate the previous version of the element unreachable during the execution of the current version of the program during debug unless the current version of the program is modified so that the previous version of the element is called and executed in place of the current version of the element;

compiling the current version of the program for debug; and executing the current version of the program by a debugger, wherein, in response to receiving an instruction selecting the previous version of the element, the debugger calls and executes the previous version of the element in place of the current version of the element.

2. The storage medium of claim 1, wherein creating the compiler directive includes mangling the name of the previous version of the element, producing a mapping to the previous version of the element, and flagging the previous version of the element.

3. The storage medium of claim 1, wherein inserting the previous version of the element includes inserting a latest previous version of the element.

4. The storage medium of claim 1, wherein inserting the previous version of the element includes inserting all previous versions of the element created within a predetermined time frame.

5. The storage medium of claim 1, wherein the element of the program is selected from one of a routine, a block, or a line.

6. A computer system including a processor and a memory encoded with instructions, wherein the instructions when executed on the processor perform the following operations:

receiving a request to compile a current version of a program for debug;

identifying, by an integrated development environment, a previous version of an element of the program, wherein the previous version of the element is identified by comparing the current version of the program to a previous version of the program, and the previous version of the element and a current version of the element are different;

inserting the previous version of the element into the current version of the program;

creating a compiler directive identifying the previous version of the element, wherein the compiler directive instructs a compiler to designate the previous version of the element unreachable during the execution of the current version of the program during debug unless the current version of the program is modified so that the previous version of the element is called and executed in place of the current version of the element;

compiling the current version of the program for debug; and executing the current version of the program by a debugger, wherein, in response to receiving an instruction selecting the previous version of the element, the debugger calls and executes the previous version of the element in place of the current version of the element.

7. The computer system of claim 6, wherein creating the compiler directive includes mangling the name of the previous version of the element, producing a mapping to the previous version of the element, and flagging the previous version of the element.

8. The computer system of claim 6, wherein the element of the program is selected from one of a routine, a block, or a line.

9. The computer system of claim 6, further comprising selecting the previous version of the element from a plurality of other previous versions of the element.

10. The storage medium of claim 1, further comprising selecting the previous version of the element from a plurality of other previous versions of the element.

* * * * *